(12) United States Patent
Aggarwal et al.

(10) Patent No.: US 10,097,265 B2
(45) Date of Patent: Oct. 9, 2018

(54) TECHNIQUES FOR POSITION-BASED ACTIONS USING LIGHT-BASED COMMUNICATION

(71) Applicant: OSRAM SYLVANIA Inc., Wilmington, MA (US)

(72) Inventors: Anant Aggarwal, Waltham, MA (US); Christian Breuer, Dortmund (DE); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/127,912

(22) PCT Filed: Mar. 25, 2015

(86) PCT No.: PCT/US2015/022531
§ 371 (c)(1),
(2) Date: Sep. 21, 2016

(87) PCT Pub. No.: WO2015/148696
PCT Pub. Date: Oct. 1, 2015

(65) Prior Publication Data
US 2017/0104531 A1  Apr. 13, 2017

Related U.S. Application Data

(60) Provisional application No. 61/970,332, filed on Mar. 25, 2014.

(51) Int. Cl.
*H04B 10/50* (2013.01)
*H04B 10/116* (2013.01)
(Continued)

(52) U.S. Cl.
CPC .......... *H04B 10/116* (2013.01); *G08C 23/04* (2013.01); *G08C 2201/91* (2013.01)

(58) Field of Classification Search
CPC .......................... H04B 10/116; H04W 64/006
(Continued)

(56) References Cited

U.S. PATENT DOCUMENTS

2005/0239479 A1* 10/2005 Bednasz ........... H04M 1/72572
455/456.1
2008/0114594 A1* 5/2008 Forbes .................... G10L 15/22
704/235
(Continued)

FOREIGN PATENT DOCUMENTS

| JP | 2011 128948 A | 6/2011 |
| KR | 2010 0067881 A | 6/2010 |
| WO | 2008/122938 A2 | 10/2008 |

OTHER PUBLICATIONS

Anna-Maria Brosa, International Search Report and Written Opinion of the International Searching Authority for PCT/US2015/022531, dated Jul. 9, 2015, pp. 1-10, European Patent Office, Rijswijk, The Netherlands.

*Primary Examiner* — Oommen Jacob
(74) *Attorney, Agent, or Firm* — Yutian Ling

(57) ABSTRACT

Techniques are disclosed for position-based actions using light-based communication (LCom). LCom signals can be used to encode or otherwise provide data which in turn can be used to help determine the position of a device receiving those LCom signals. Therefore, LCom can be used to facilitate various actions based on, for example, the position of an LCom receiver determined using data received via the LCom signals. There are numerous use cases for position-based actions using LCom, such as security applications, check-in applications, payments based on location, permissions, and access to information that can all be tied to a location. Actions may include temporarily disabling or enabling the LCom receiver hardware or software (such as disabling device cameras in high security areas), providing (Continued)

another security layer as a result of knowing the device position, and using the LCom receiver position as a part of a larger process.

15 Claims, 5 Drawing Sheets

(51) Int. Cl.
  *H04W 4/02* (2018.01)
  *H04W 4/04* (2009.01)
  *G08C 23/04* (2006.01)
(58) Field of Classification Search
  USPC .......................................... 398/118, 115, 116
  See application file for complete search history.

(56) References Cited

U.S. PATENT DOCUMENTS

| | | | |
|---|---|---|---|
| 2009/0099772 A1* | 4/2009 | Chiu | G01C 21/165 701/469 |
| 2009/0171571 A1* | 7/2009 | Son | G01C 21/20 701/532 |
| 2009/0284366 A1* | 11/2009 | Haartsen | G01S 1/70 340/531 |
| 2011/0242967 A1* | 10/2011 | Starr | G06F 9/44505 370/221 |
| 2012/0077431 A1* | 3/2012 | Fyke | G07C 9/00015 455/41.1 |
| 2012/0220216 A1* | 8/2012 | Carbonell Duque | H04B 5/0031 455/26.1 |
| 2013/0116964 A1* | 5/2013 | van Roermund | G06K 7/0008 702/141 |
| 2013/0141554 A1* | 6/2013 | Ganick | G01S 1/70 348/61 |
| 2013/0330088 A1 | 12/2013 | Oshima et al. | |
| 2014/0375982 A1* | 12/2014 | Jovicic | G01B 11/14 356/72 |
| 2015/0280821 A1* | 10/2015 | Breuer | G01C 3/08 398/25 |

* cited by examiner

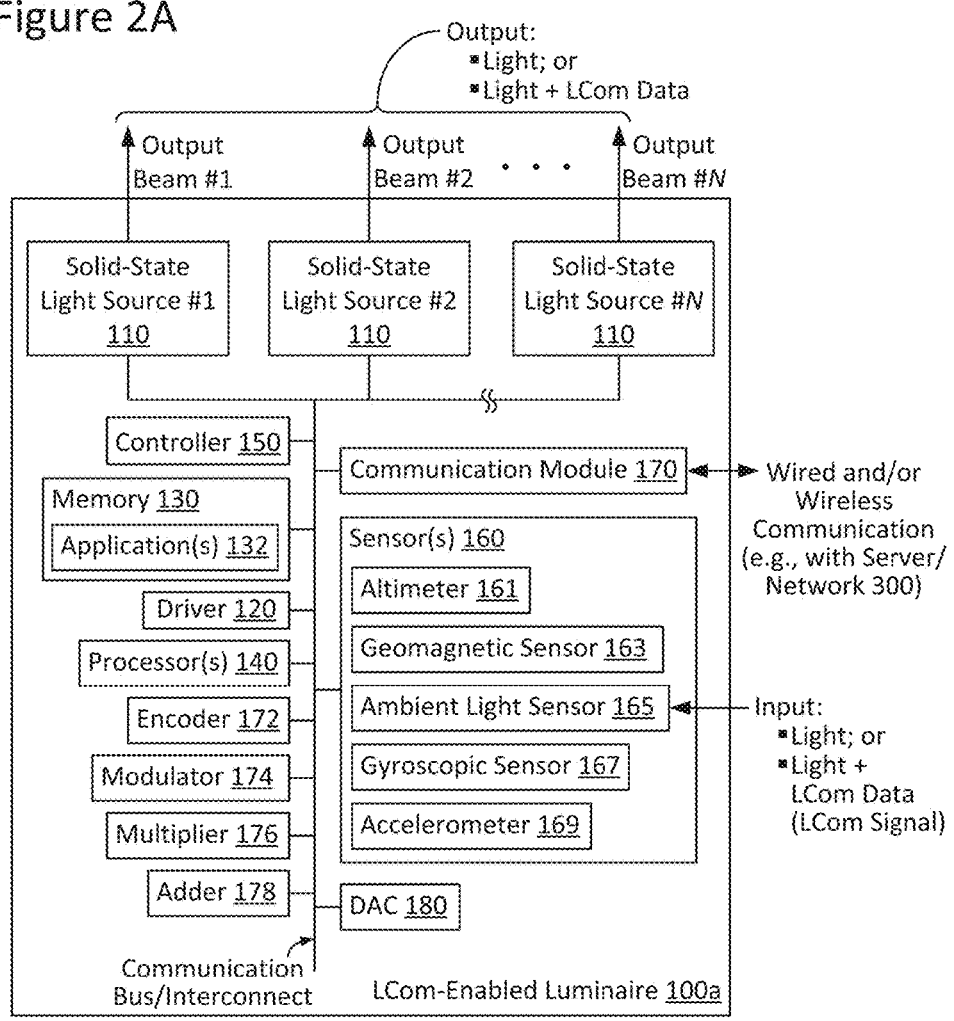

TECHNIQUES FOR POSITION-BASED ACTIONS USING LIGHT-BASED COMMUNICATION

CROSS-REFERENCE TO RELATED APPLICATIONS

This patent application is a National Stage application of, and claims the benefit of, International Application No. PCT/US2015/022531, filed Mar. 25, 2015, which claims the benefit of U.S. Provisional Patent Application No. 61/970,332, titled "Light Communication Application", filed on Mar. 25, 2014, which is herein incorporated by reference in its entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

BRIEF DESCRIPTION OF THE DRAWINGS

FIG. 2A is a block diagram illustrating an LCom-enabled luminaire configured in accordance with an embodiment of the present disclosure.

Figure 1:
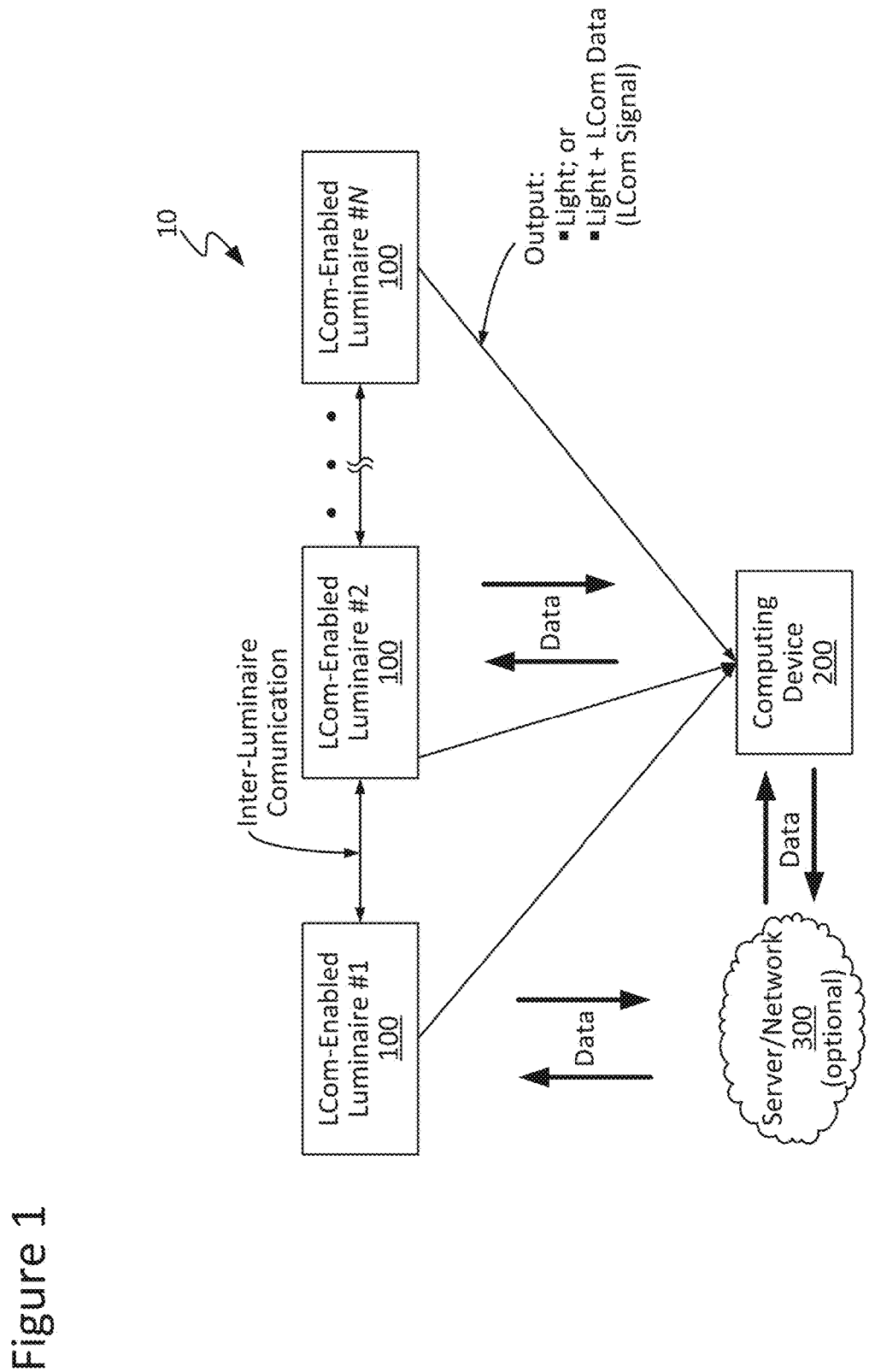
FIG. 1 is a block diagram illustrating an example light-based communication (LCom) system configured in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for position-based actions using light-based communication (LCom). LCom signals, which generally include modulated light signals, can be used to encode or otherwise provide data which in turn can be used to help determine the position of a device receiving those LCom signals. The data may include or indicate, for example, an absolute position of the light source providing the LCom signal (e.g., global coordinates of the light source), or a position relative to that light source (e.g., a door near the light source). Note that this locationing information also applies to the receiving device, which has to be within a relatively close range of the emitting light source to receive the LCom signals. Therefore, LCom can be used to facilitate various actions based on, for example, the position of an LCom receiver determined using data received via the LCom signals. Note that position or location as used interchangeably herein may also refer to at least one of a relative position or location of the LCom receiver (e.g., the position of the LCom receiver relative to a reference point indicated in the LCom signals) and an absolute position or location of the LCom receiver (e.g., global coordinates). As will be appreciated in light of this disclosure, there are numerous use cases for position-based actions using LCom, such as security applications, check-in applications, payments based on location, permissions, and access to information that can all be tied to a location. Some example actions may include temporarily disabling or enabling the LCom receiver (computing device) hardware or software, such as a peripheral device like a camera, sound card, display driver, or other function-specific circuitry within or otherwise operatively coupled to the LCom receiver (e.g., operatively coupled to a processor of the LCom receiver). Such example actions may include disabling the device camera in a sensitive or high security area, disabling video/sound recording capability at a concert or movie, or enabling company email only within company buildings, just to name a few examples. Some example actions may include using the LCom receiver position/location as a part of a larger process, such as using the receiver location (determined based on at least a received LCom signal) as a check-in point for social applications or travel purposes or only allowing access to certain content based on the receiver location, just to name a few examples. Some example actions may include providing another security layer as a result of knowing the device location/position (determined based on at least a received LCom signal), such as granting access at a specific door, enabling automated teller machine transactions, or receiving a secure message in response to sending a grant access request, just to name a few examples. Numerous configurations and variations will be apparent in light of the present disclosure.

General Overview

As the world evolves where computing devices (e.g., smartphone, tablet, etc.) are now interconnected and have a host of sensors such as cameras and microphones, it may be desirable to perform certain actions based on the position/location of the computing device, such as enabling or disabling particular hardware or software of the computing device based on the position/location of the device. Existing smartphones and mobile computing devices utilize a combination of global positioning system (GPS) and Wi-Fi technologies to provide positioning capabilities, such as various Wi-Fi positioning systems (WPS). However, these existing GPS-based and WPS-based techniques suffer from a number of limitations that make their use impractical for indoor positioning. In particular, GPS has an accuracy of only several meters and is limited to outdoor use, and the availability and range of Wi-Fi network connections are limited by factors such as the placement of Wi-Fi hotspots, security restrictions imposed by network providers, and other environmental factors. Therefore, GPS and WPS fail to achieve sufficient positioning accuracies for certain applications.

Thus, and in accordance with some embodiments of the present disclosure, techniques are disclosed for position-based actions using light-based communication (LCom). As used herein, light-based communication (LCom) generally refers to communication between a solid-state luminaire and a receiver device, such as a smartphone or other mobile computing device, using a pulsing light signal that emanates from the luminaire and is encoded with data. In general, the light utilized in LCom may be of any spectral band, visible or otherwise, and may be of any intensity, as desired for a given target application or end-use. In accordance with some embodiments, in an LCom system, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera and/or an ambient light sensor, among others. In some embodiments, the total light output may be maintained at a relatively constant level, such that the light output variance is not perceptible by human vision.

As will be apparent in light of the present disclosure, LCom signals, which generally include modulated light signals, can be used to encode or otherwise provide data which in turn can be used to help determine the position of a device receiving those LCom signals. The data may include or indicate, for example, an absolute position of the light source providing the LCom signal (e.g., global coordinates of the light source), or a position relative to that light source (e.g., a door near the light source). Note that this locationing information also applies to the receiving device, which has to be within a relatively close range of the emitting light source to receive the LCom signals. Therefore, LCom can be used to facilitate various actions based on, for example, the position of an LCom receiver determined using data received via the LCom signals. Note that position or location as used interchangeably herein may also refer to at least one of a relative position or location of the LCom receiver (e.g., the position of the LCom receiver relative to a reference point indicated in the LCom signals) and an absolute position or location of the LCom receiver (e.g., global coordinates). As will be appreciated in light of this disclosure, there are numerous use cases for position-based actions using LCom, such as security applications, check-in applications, payments based on location, permissions, and access to information that can all be tied to a location. Some example actions may include temporarily disabling or enabling the LCom receiver (computing device) hardware or software, such as a peripheral device like a camera, sound card, display driver, or other function-specific circuitry within or otherwise operatively coupled to the LCom receiver (e.g., operatively coupled to a processor of the LCom receiver). Such example actions may include disabling the device camera in a sensitive or high security area, disabling video/sound recording capability at a concert or movie, or enabling company email only within company buildings, just to name a few examples.

Some example actions may include temporarily disabling or enabling the LCom receiver (computing device) hardware or software, such as disabling the device camera in a sensitive or high security area, disabling video/sound recording capability at a concert or movie, or enabling company email only within company buildings, just to name a few examples. Some example actions may include using the LCom receiver position/location as a part of a larger process, such as using the receiver location (determined based on at least a received LCom signal) as a check-in point for social applications or travel purposes or only allowing access to certain content based on the receiver location, just to name a few examples. Some example actions may include providing another security layer as a result of knowing the device location/position (determined based on at least a received LCom signal), such as granting access at a specific door, enabling automated teller machine transactions, or receiving a secure message in response to sending a grant access request, just to name a few examples. Numerous suitable actions, applications, and use-cases will be apparent in light of this disclosure and the examples provided herein are for illustrative purposes and are not intended to be exhaustive.

As will be appreciated in light of this disclosure, techniques disclosed herein can be utilized in any of a wide range of LCom applications and contexts. For example, techniques disclosed herein can be utilized, in accordance with some embodiments, in transmitting location and positioning information between an LCom-enabled luminaire and a receiver device. This information may be utilized, in part or in whole, to cause or allow for one or more actions, in some embodiments. In some cases, techniques disclosed herein can be utilized as the basis for a positioning that may realize improvements in positioning precision and accuracy over, for example, existing GPS-based and WPS-based systems. As such, it follows that techniques disclosed herein can be utilized, in accordance with some embodiments, for commercial endeavors not possible with existing GPS-based and Wi-Fi-based approaches. More particularly, while the limited accuracy of existing GPS-based and Wi-Fi-based approaches is not sufficient for, for example, determining that a user is located outside of a particular door, techniques disclosed herein can be utilized, in accordance with some embodiments, to lead customers directly to in-store promotions and other on-shelf items, as desired. Numerous configurations and variations will be apparent in light of this disclosure.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in both or multiple directions; for instance, LCom data may be passed between a given LCom-enabled luminaire 100 and a computing device 200, where both act in a transmitting and receiving (e.g., transceiver) capacity. In some cases in which system 10 includes a plurality of LCom-enabled luminaires 100, all (or some sub-set) of thereof may be configured for communicative coupling with one another (e.g., inter-luminaire communication). In accordance with some embodiments, system 10 optionally may include or otherwise be configured for communicative coupling, for example, with a server/network 300 (discussed below). Communicative coupling may be provided, for example, between server/network 300 and computing device 200 and/or one or more LCom-enabled luminaires 100, as desired. In some embodiments, computing device 200 and one or more luminaires 100 may be communicatively coupled to allow for the transmission of data between the device 200 and luminaire(s) 100.

Figure 2B:
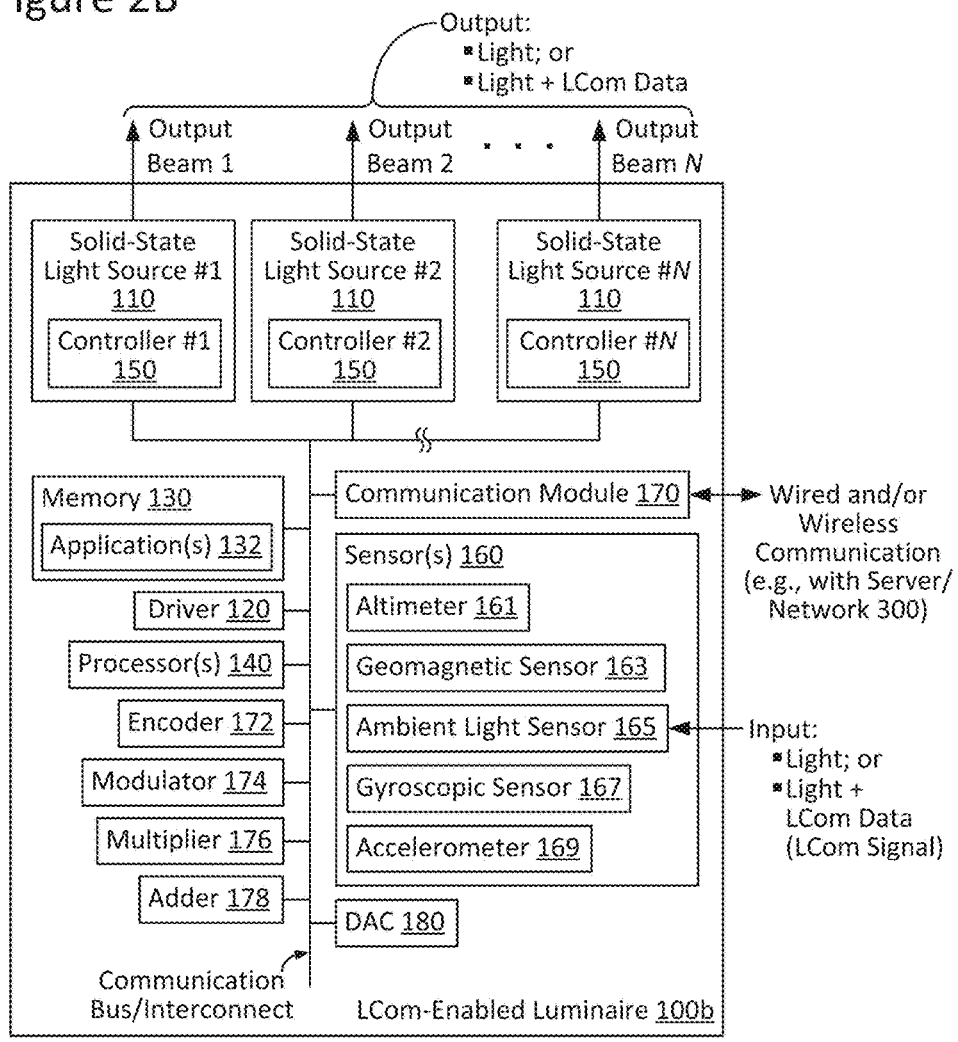
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. For consistency and ease of understanding of the present disclosure, LCom-enabled luminaires 100a and 100b hereinafter may be collectively referred to generally as an LCom-enabled luminaire 100, except where separately referenced.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis.

The one or more modules stored in memory 130 can be accessed and executed, for example, by the one or more processors 140 of a given LCom-enabled luminaire 100. In accordance with some embodiments, a given module of memory 130 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 130 can be encoded, for example, on a machine-readable medium that, when executed by a processor 140, carries out the functionality of a given LCom-enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 130 (e.g., one or more applications 132, discussed below) can be implemented in hardware, software, and/or firmware, as desired for a given target application or end-use.

In accordance with some embodiments, memory 130 may have stored therein (or otherwise have access to) one or more applications 132. In some instances, a given LCom-enabled luminaire 100 may be configured to receive input, for example, via one or more applications 132 stored in memory 130 (e.g., such as a lighting pattern, LCom data, etc.). Other suitable modules, applications, and data which may be stored in memory 130 (or may be otherwise accessible to a given LCom-enabled luminaire 100) will depend on a given application and will be apparent in light of this disclosure.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150, in accordance with some embodiments. In some embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface, optional server/network 300, etc.). As a result, a given LCom-enabled luminaire 100 may be controlled in such a manner as to output any number of output beams (1-N), which may include light and/or LCom data (e.g., an LCom signal), as desired for a given target application or end-use.

However, the present disclosure is not so limited. For example, in some other embodiments, such as that illustrated in FIG. 2B, a controller 150 may be hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional server/network 300, etc.). As a result, LCom-enabled luminaire 110 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Other suitable configurations for DAC 180 will depend on a given application and will be apparent in light of this disclosure.

Figure 3:
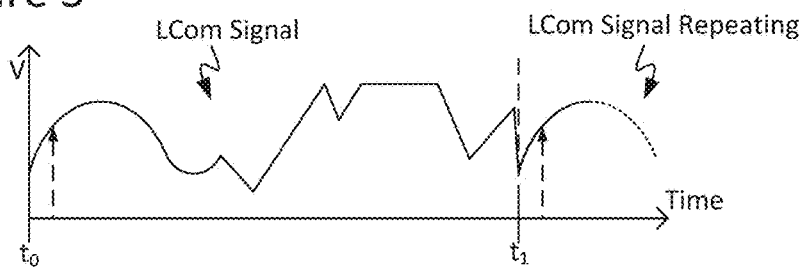
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured, in accordance with some embodiments, to transmit a given LCom signal at a given transmission rate over a given time interval ($t_1-t_0$). In some cases, a given LCom-enabled luminaire 100 may be configured to repeatedly output its one or more LCom signals. In any case, the transmission rate may be customized, as desired for a given target application or end-use.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 4:
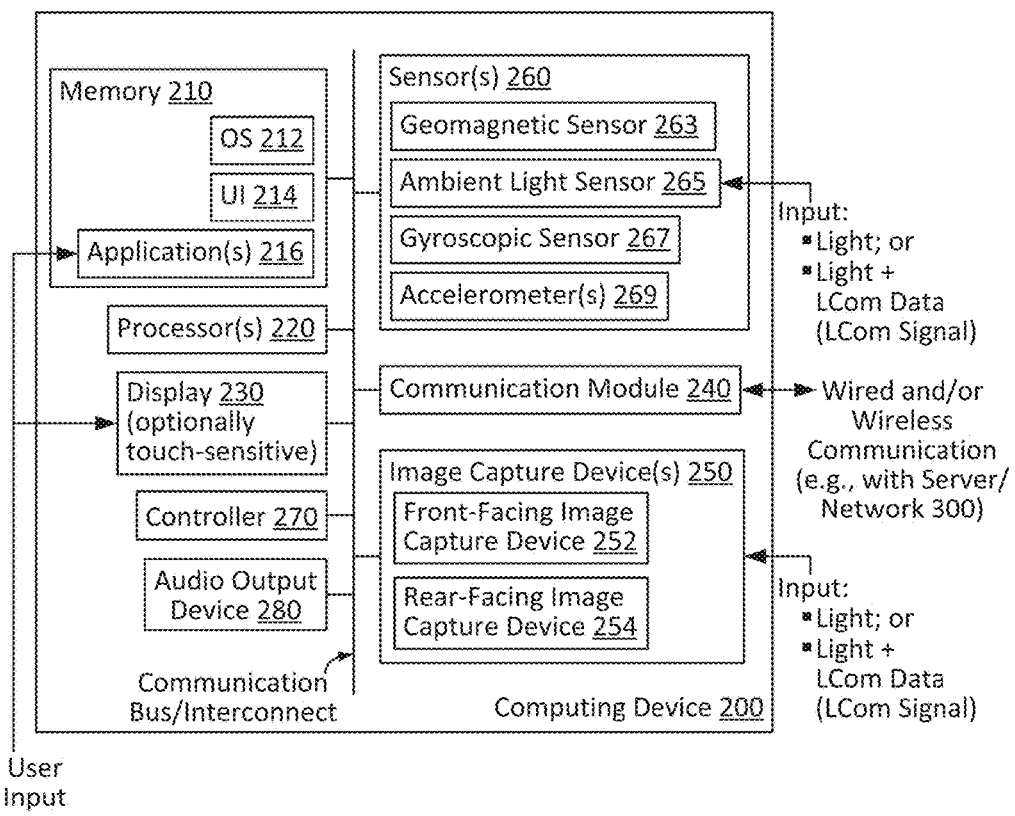
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as OS 212, UI 214, and/or one or more applications 216, each discussed below) can be implemented in hardware, software, and/or firmware, as desired for a given target application or end-use.

In accordance with some embodiments, memory 210 may include an operating system (OS) 212. OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure.

In accordance with some embodiments, computing device 200 may include a user interface (UI) module 214. In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCom-related techniques discussed herein. Other suitable configurations and capabilities for UI 214 will depend on a given application and will be apparent in light of this disclosure.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100. In some cases, communication module 240 of computing device 200 and communication module 170 of a given LCom-enabled luminaire 100 may be configured to utilize the same communication protocol. In some cases, communication module 240 may be configured to communicate with a server/network 300 (discussed below). Other suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous configurations will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communicative coupling, for example, with a server/network 300 and one or more LCom-enabled luminaires 100. In some cases, computing device 200 may be configured to receive data from server/network 300, for example, which serves to supplement LCom data received by computing device 200 from a given LCom-enabled luminaire 100. In some instances, computing device 200 may be configured to receive data (e.g., such as position, ID, and/or other data pertaining to a given LCom-enabled luminaire 100) from server/network 300 that facilitates indoor navigation via one or more LCom-enabled luminaires 100. In some cases, server/network 300 may include or otherwise have access to one or more lookup tables of data that may be accessed by a computing device 200 communicatively coupled therewith. Numerous configurations for server/network 300 will be apparent in light of this disclosure.

Techniques for Position-Based Actions Using LCom

As previously noted, as the world evolves where computing devices (e.g., smartphone, tablet, etc.) are now interconnected and have a host of sensors such as cameras and microphones, it may be desirable to perform certain actions based on the position/location of the computing device, such as enabling or disabling particular hardware or software of the computing device based on the position/location of the device. Existing smartphones and mobile computing devices utilize a combination of global positioning system (GPS) and Wi-Fi technologies to provide positioning capabilities, such as various Wi-Fi positioning systems (WPS). However, these existing GPS-based and WPS-based techniques suffer from a number of limitations that make their use impractical for indoor positioning. In particular, GPS has an accuracy of only several meters and is limited to outdoor use, and the availability and range of Wi-Fi network connections are limited by factors such as the placement of Wi-Fi hotspots, security restrictions imposed by network providers, and other environmental factors. Therefore, GPS and WPS fail to achieve sufficient positioning accuracies for certain applications.

Thus, and in accordance with some embodiments of the present disclosure, techniques are disclosed for position-based actions using light-based communication (LCom). As used herein, light-based communication (LCom) generally refers to communication between a solid-state luminaire and a receiver device, such as a smartphone or other mobile computing device, using a pulsing light signal that emanates from the luminaire and is encoded with data. In general, the light utilized in LCom may be of any spectral band, visible or otherwise, and may be of any intensity, as desired for a given target application or end-use. In accordance with some embodiments, in an LCom system, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera and/or an ambient light sensor, among others. In some embodiments, the total light output may be maintained at a relatively constant level, such that the light output variance is not perceptible by human vision.

As will be apparent in light of the present disclosure, LCom signals, which generally include modulated light signals, can be used to encode or otherwise provide data which in turn can be used to help determine the position of a device receiving those LCom signals. The data may include or indicate, for example, an absolute position of the light source providing the LCom signal (e.g., global coordinates of the light source), or a position relative to that light source (e.g., a door near the light source). Note that this locationing information also applies to the receiving device, which has to be within a relatively close range of the emitting light source to receive the LCom signals. Therefore, LCom can be used to facilitate various actions based on, for example, the position of an LCom receiver determined using data received via the LCom signals. Note that position or location as used interchangeably herein may also refer to at least one of a relative position or location of the LCom receiver (e.g., the position of the LCom receiver relative to a reference point indicated in the LCom signals) and an absolute position or location of the LCom receiver (e.g., global coordinates). As will be appreciated in light of this disclosure, there are numerous use cases for position-based actions using LCom, such as security applications, check-in applications, payments based on location, permissions, and access to information that can all be tied to a location. Some example actions may include temporarily disabling or enabling the LCom receiver (computing device) hardware or software, such as a peripheral device within or otherwise operatively coupled to the LCom receiver (e.g., operatively coupled to a processor of the LCom receiver). Such example actions may include disabling the device camera in a sensitive or high security area, disabling video/sound recording capability at a concert or movie, or enabling company email only within company buildings, just to name a few examples. Note that peripheral device as used herein includes a device used to provide information to and/or receive information from a computing device and/or a processor of a computing device. For example, peripheral devices may include: input devices, such as keyboards, touchscreens, image sensors or cameras, and microphones; output devices, such as displays, printers, projectors, and speakers; input/output devices, such as modems and network interface controllers (NICs); and storage devices, such as disk drives, flash drives, and mobile computing storage interfaces.

Some example actions may include temporarily disabling or enabling the LCom receiver (computing device) hardware or software, such as disabling the device camera in a sensitive or high security area, disabling video/sound recording capability at a concert or movie, or enabling company email only within company buildings, just to name a few examples. Some example actions may include using the LCom receiver position/location as a part of a larger process, such as using the receiver location (determined based on at least a received LCom signal) as a check-in point for social applications or travel purposes or only allowing access to certain content based on the receiver location, just to name a few examples. Some example actions may include providing another security layer as a result of knowing the device location/position (determined based on at least a received LCom signal), such as granting access at a specific door, enabling automated teller machine transactions, or receiving a secure message in response to sending a grant access request, just to name a few examples. Numerous suitable actions, applications, and use-cases will be apparent in light of this disclosure and the examples provided herein are for illustrative purposes and are not intended to be exhaustive.

To provide a more specific example of a position-based action using LCom, such an action may include disabling a smartphone camera in a sensitive business area, such as a research and development lab, where confidential materials are located. In such an example case, if the user were to try to use the smartphone or the smartphone camera, then LCom signals received from one or more luminaires in the sensitive area may cause the camera to be disabled at the software and/or hardware level. In some such cases, the user may be required to install or initiate an application on the smartphone that allow it to be LCom-enabled such that the LCom signals can be detected and decoded. In another specific example case, the position/location of the computing device (determined based on at least a received LCom signal) may allow certain applications to launch, such as an application that allows access to a secure door. In such an example case, access to the secure door may only be available when the computing device is physically at the secure door (determined based on at least a received LCom signal), thereby only allowing the door to be opened when physically at the location, for example. Further, in such an example case, because the computing device has to be physically located at the door, another security layer is added for gaining access to open the door, which may complement a password entry, for example.

Figure 5:
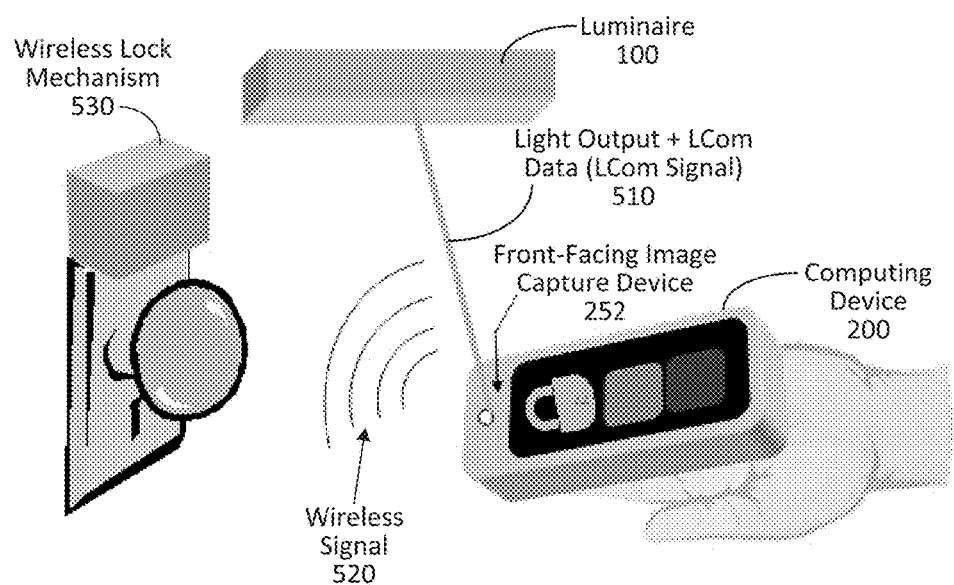
FIG. 5 illustrates an example LCom system demonstrating an example position-based action, in accordance with an embodiment of the present disclosure.

FIG. 5 illustrates an example LCom system demonstrating an example position-based action, in accordance with an embodiment of the present disclosure. As can be seen, luminaire 100 is providing light output 510 that includes an LCom signal, in this example case. Luminaire 100 may be configured in any suitable manner, including using the configurations and system architecture variously described herein. Further, light output 510 and the accompanying LCom signal(s) may be emitted/transmitted from luminaire 100 in any suitable manner, including using the techniques variously described herein. FIG. 5 also includes computing device 200, which may be configured in any suitable manner, including using the configurations and system architecture variously described herein. As shown in this example case, computing device 200 is a smartphone that includes front-facing image capture device 252 (e.g., a front-facing camera). Although the example position-based action of FIG. 5 is demonstrated with a front-facing image capture device/camera 252, any suitable light sensor device may be used as will be apparent in light of this disclosure. Further, the techniques for position-based actions can be applied to numerous devices, such as various tools in a machine shop, medical equipment, and vehicles, just to name a few example categories of devices. Therefore, the specific computing device 200 in this example case (a smartphone) is not intended to be limiting and is used for ease of description.

Continuing with FIG. 5, the example position-based action demonstrated includes using LCom to add a layer of security for gaining access to a secure door. In this example case, the door unlocking application has been launched to wirelessly unlock the wireless lock mechanism 530. Light output including one or more LCom signals 510 may be used to verify the position of computing device 200 to ensure that the device 200 is within a certain proximity of wireless lock mechanism 530, for example. Such a verification may be achieved using the location of the device 200 determined using LCom signals 510, data decoded from LCom signals 510, and/or any other suitable techniques as will be apparent in light of this disclosure. In addition to the verification using LCom signals 510, the user may be required to enter an unlock code using, for example, the touch-screen display 230. As can be seen, the user may have to enter a sequence using the two software buttons on screen 230, and when the proper sequence is entered, a wireless signal 520 may be sent to unlock the wireless lock mechanism. Note that any suitable code entry techniques and system may be used, such as entering a pin, password, voice code, face code, etc. The requirement that the computing device needs to be located at the can prevent the wireless lock mechanism 530 from being unlocked remotely, thereby adding a security layer of requiring the device to be physically positioned such that it can receive LCom signals 510 from luminaire 100.

In an example case where there are multiple doors in an area or room, the proper door may be unlocked based on the location determined by LCom signals 510, such as opening the door closest to the luminaire 100 providing the LCom signals 510. For example, the LCom signals may include information that the luminaire is located near lab door number twenty-seven and that particular door may be the one to unlock/open in response to entering the proper sequence and not any other door. This can help prevent unlocking the wrong door. In another security specific case, the following process may be used to, for example, make the action more tamper-safe (e.g., against man-in-the-middle attacks or recording of the luminaire light output 510 for later playback): 1) computing device 200 sends a grant access request (e.g., via general packet radio service (GPRS) or Wi-Fi); 2) the involved security server transmits a requester-specific and time dependent message to the LCom-enabled luminaire 100 (e.g., encrypted by a private key for the luminaire 100); 3) the luminaire 100 decrypts the message and sends it to computing device 200 via LCom 510; and 4) the computing device 200 returns the message back to the server which then grants access to the requested service (e.g., to wireless lock mechanism 530).

As previously described, the LCom signals 510 may help a computing device 200 determine its location or the location of the luminaire 100 emitting the LCom signals 510 (e.g., by emitting location coordinates) and/or the LCom signals 510 may include data related to position-based actions variously described herein. For example, the data emitted via LCom signals 510 may include verification codes and in order to verify that the computing device 200 is at or near a certain location, the device 200 may use the verification code to determine that location. To provide a specific example, the LCom signals 510 may include codes indicating that the present location is the "front door at ABC warehouse". In such a specific example, the LCom signals 510 may not include global coordinates and device 200 may be able to perform one or more actions based on the code indicating that specific location. In other examples, specific LCom signal 510 data may include messages such as "disable all cameras", "enable Wi-Fi", "disable texting", "enable check-in application", etc., which computing device 200 may be configured to perform after receiving such LCom signals. While global coordinates may be suitable for many position-based actions, the techniques are not so limited.

As previously described, the techniques for position-based actions using LCom may include various use-cases and applications. One such example class of actions includes enabling or disabling one or more hardware features of a computing device in certain locations. Such a class may include, for example, disabling cameras in sensitive areas of a hospital, disabling video/sound recordings at a concert, disabling camera and sound in high security areas, disabling cameras when a certain person is nearby (e.g., an actor, a political figure, etc.), enabling or granting access to Wi-Fi only within a certain area and not in others (e.g., only within a building and not outside of the building), etc. In the example case where hardware (e.g., a camera) is disabled when a certain person is nearby, such functionality may move with the person, which may have an application for paparazzi, for example. Another example class of actions includes enabling or disabling applications/software of a computing device in certain locations. Such a class may include, for example, disabling texting in the driver's seat of a vehicle, disabling social media apps at the dinner table during certain times, disabling social media app(s) on the factory floor even if using personal data plan of the phone, enabling check-in app(s) such as a time card app, enabling company email only within company buildings, enabling coupon app(s) to only display codes at certain location to minimize copying, etc. Another example class of actions includes knowing the location of the computing device is one element of a larger process. Such a class may include, for example, providing location to a train fees app where the app knows how much to charge based on destination station, providing tour guide audio/video enhanced on location, allowing music to be previewed only at a music selling store, disabling silent mode on ring tone in class rooms so the teacher always knows of inappropriate cell phone usage, etc. Another example class of actions includes security-related applications. Such a class may include, for example, gaining access to a door based on the location in addition to a key pad code or some computing device transmission (e.g., for hotel rooms, secure business areas, etc.), allowing access to a pool gate only when another user with a registered computing device is at the location for parent supervision, enabling automated teller machine (ATM) or other money-related transactions only when computing device of user is at the location, airport check-in, etc. Numerous actions and classes of actions will be apparent in light of the present disclosure.

Figure 6:
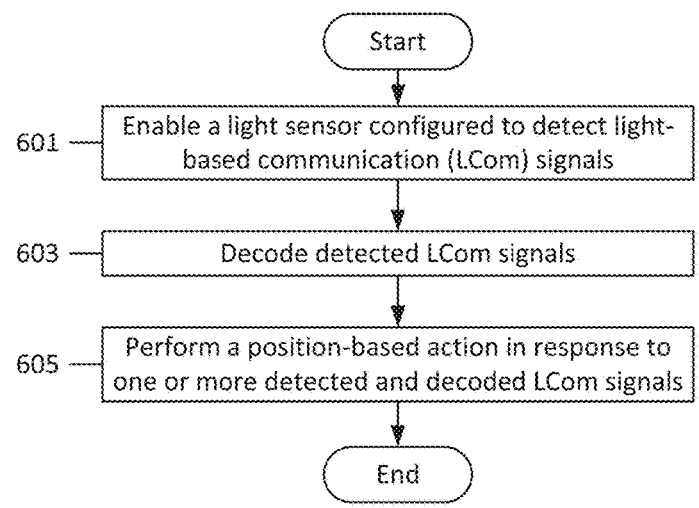
FIG. 6 illustrates an example method of performing position-based actions using LCom, in accordance with an embodiment of the present disclosure.

FIG. 6 illustrates an example method of performing position-based actions using LCom, in accordance with an embodiment of the present disclosure. The method of FIG. 14B includes enabling 601 a light sensor configured to detect LCom signals. The light sensor may be a component of computing device 200, such as light sensor 265 or image capture device 252, 254, for example. The method continues by decoding 603 detected LCom signals. The decoding may be performed by processor 220 and/or controller 270 of computing device 200, for example. The method continues by performing 605 a position-based action in response to one or more detected and decoded LCom signals. The position-based action may be any suitable action, such as the actions variously described herein, and the actions may be performed, executed, or otherwise caused to be carried out by processor 220 and/or controller 270 of computing device 200, for example.

Numerous variations on the methodology of FIG. 6 will be apparent in light of this disclosure. As will be appreciated, and in accordance with some embodiments, each of the functional boxes (e.g., 601, 603, 605) shown in the figure can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.).

In some embodiments, a non-transitory computer program product encoded with instructions that, when executed by one or more processors, causes a process to be carried out, the process comprising the method of FIG. 6.

An example alternative to the techniques for position-based actions described herein may include biometrics, such as finger print or retina scanning. However, biometrics generally requires special receiving hardware, such as a finger print reader or retinal scanner. Another example alternative, which primarily relates to the actions of disabling computing device hardware and/or software, is to use jamming signals to block usage of the device. However, such an option typically does not discriminate on what usage is blocked, resulting in more functionality being disabled than needed or desired. Using LCom for the position-based actions variously described herein is advantageous because LCom can be configured to work with the current hardware in most smartphones. Therefore, LCom is a cost-effective technology for the position-based actions. For example, typical smartphones may become LCom ready through a software update or by downloading an LCom application (or computer program product). In some cases, GPS may be used to supplement or supplant LCom for the position-based actions variously described herein. For example, GPS may be used to verify location, particularly in the context of outside applications. However, when it comes to indoor locations, LCom provides a significant advantage. Therefore, all of the benefits that come with being able to perform position-based actions indoors (or outdoors in areas including LCom-enabled luminaires or opportunity for the same) can be realized using LCom. For example, knowing the location of a computing device (and therefore, the user of the device, when there is one), such devices can be limited in terms of hardware and/or software to allow the device to still be in the area but also prevent components of the device from being used (e.g., to prevent driving and texting, prevent camera usage in sensitive areas, prevent video recording in movie theaters, etc.). Further, in terms of security, requiring a position element adds one more layer of security that can help prevent remote hacking. Additional benefits of the techniques will be apparent in light of this disclosure.

Numerous embodiments will be apparent in light of this disclosure. One example embodiment provides a device including: a light sensor configured to detect light-based communication (LCom) signals from a luminaire; and a processor operatively coupled to the light sensor and configured to decode detected LCom signals; wherein in response to one or more detected and decoded LCom signals, the processor is further configured to perform a position-based action. In some cases, the LCom signals are provided via light output from the luminaire and wherein the total light output is configured to be maintained at a relatively constant level, such that the light output variance is not perceptible by human vision. In some cases, the position-based action includes at least one of temporarily enabling a peripheral device operatively coupled to the processor and temporarily disabling a peripheral device operatively coupled to the processor. In some cases, the position-based action includes at least one of temporarily enabling device software and temporarily disabling device software. In some cases, the position-based action is based on the device location determined using the one or more LCom signals. In some cases, the position-based action provides notice of the device location for at least one of check-in purposes and security purposes. In some cases, the position-based action includes providing a security checkpoint as a result of the device being physically positioned such that it can receive the one or more LCom signals. In some such cases, the position-based action includes at least one of sending a grant access request and receiving a message used to gain access to a secure area. In some cases, the position-based action includes receiving a code provided via the one or more LCom signals, the code usable for achieving access to at least one of an area, service, and content. In some cases, a system is provided, the system including the device and the luminaire.

Another example embodiment provides a method including: enabling a light sensor configured to detect light-based communication (LCom) signals; decoding detected LCom signals; and in response to one or more detected and decoded LCom signals, performing a position-based action. In some cases, the LCom signals are provided via light output from a luminaire and wherein the total light output is configured to be maintained at a relatively constant level, such that the light output variance is not perceptible by human vision. In some cases, the position-based action includes at least one of temporarily enabling device hardware and temporarily disabling device hardware. In some cases, the position-based action includes at least one of temporarily enabling device software and temporarily disabling device software. In some cases, the position-based action is based on a device location determined using the one or more LCom signals. In some cases, the position-based action provides notice of a device location for at least one of check-in purposes and security purposes. In some cases, the position-based action includes providing a security checkpoint as a result of a device being physically positioned such that it can receive the one or more LCom signals. In some such cases, the position-based action includes at least one of sending a grant access request and receiving a message used to gain access to a secure area. In some cases, the position-based action includes receiving a code provided via the one or more LCom signals, the code usable for achieving access to at least one of an area, service, and content.

Another example embodiment provides a non-transitory computer program product comprising a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes: enable a light sensor configured to detect light-based communication (LCom) signals; decode detected LCom signals; and in response to one or more detected and decoded LCom signals, perform a position-based action.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A system comprising:
   a server configured to:
      receive, from a computing device, a grant access request; and
      transmit an encrypted message to a luminaire based on the grant access request;
   a luminaire configured to:
      receive, from the server, the encrypted message;
      decrypt the encrypted message; and
      transmit the decrypted message to the computing device via a light-based communication (LCom) signal; and
   the computing device, wherein the computing device comprises:
      a light sensor configured to detect the LCom signal from the luminaire; and
      a processor operatively coupled to the light sensor and configured to:
         transmit the grant access request to the server;
         decode the decrypted message from the LCom signal; and
         perform a position-based action based on the decrypted message, wherein the position-based action includes providing a security checkpoint as a result of the computing device being physically positioned such that it can receive the LCom signal, and wherein the LCom signal are used to verify that the computing device is in proximity to the security checkpoint.

2. The system of claim 1, wherein the luminaire is configured to maintain total light output at a relatively constant level, such that the light output variance is not perceptible by human vision.

3. The system of claim 1, wherein the position-based action further includes at least one of temporarily enabling a peripheral device operatively coupled to the processor and temporarily disabling a peripheral device operatively coupled to the processor.

4. The system of claim 1, wherein the position-based action further includes at least one of temporarily enabling computing device software and temporarily disabling computing device software.

5. The system of claim 1, wherein the position-based action is based on the computing device location determined using the LCom signal.

6. The system of claim 1, wherein the position-based action provides notice of the computing device location for at least one of check-in purposes and security purposes.

7. The system of claim 1, wherein the decrypted message comprises code usable for achieving access to at least one of an area, service, and content.

8. A method comprising:
   transmitting, from a computing device to a server, a grant access request;
   transmitting, from the server to a luminaire, an encrypted message based on the grant access request;
   decrypting, by the luminaire, the encrypted message;
   transmitting, from the luminaire to the computing device, the decrypted message via a light-based communication (LCom) signal;
   decoding, by the computing device, the decrypted message from the LCom signal; and
   performing, by the computing device, a position-based action based on the decrypted message, wherein the position-based action includes providing a security checkpoint as a result of the computing device being physically positioned such that it can receive the LCom signal, and wherein the LCom signal are used to verify that the computing device is in proximity to the security checkpoint.

9. The method of claim 8, wherein the luminaire is configured to maintain total light output at a relatively constant level, such that the light output variance is not perceptible by human vision.

10. The method of claim 8, wherein the position-based action further includes at least one of temporarily enabling computing device hardware and temporarily disabling computing device hardware.

11. The method of claim 8, wherein the position-based action further includes at least one of temporarily enabling computing device software and temporarily disabling computing device software.

12. The method of claim 8, wherein the position-based action is based on a computing device location determined using the LCom signal.

13. The method of claim 8, wherein the position-based action provides notice of a computing device location for at least one of check-in purposes and security purposes.

14. The method of claim 8, wherein the decrypted messages comprises a code usable for achieving access to at least one of an area, service, and content.

15. A non-transitory computer program product encoded with instructions that, when executed by one or more processors, causes a process to be carried out, the process comprising:
   transmit, from a computing device to a server, a grant access request;
   transmit, from the server to a luminaire, an encrypted message based on the grant access request;
   decrypt, by the luminaire, the encrypted message;
   transmit, from the luminaire to the computing device, the decrypted message via a light-based communication (LCom) signal;
   decode, by the computing device, the decrypted message from the LCom signal; and
   perform, by the computing device, a position-based action based on the decrypted message, wherein the position-based action includes providing a security checkpoint as a result of the computing device being physically positioned such that it can receive the LCom signal, and wherein the LCom signal are used to verify that the computing device is in proximity to the security checkpoint.

* * * * *